United States Patent

Moro et al.

[11] Patent Number: 5,126,524
[45] Date of Patent: Jun. 30, 1992

[54] WIRE GUIDE DEVICE FOR A WIRE ELECTRODISCHARGE MACHINE

[75] Inventors: Toshio Moro; Akihiro Sakai; Masakatsu Mune, all of Nagoya, Japan

[73] Assignee: Mitsubishi Denki K.K., Tokyo, Japan

[21] Appl. No.: 455,014

[22] Filed: Dec. 22, 1989

[30] Foreign Application Priority Data

Dec. 23, 1988 [JP] Japan ................. 63-323641

[51] Int. Cl.⁵ ............................... B23H 7/10
[52] U.S. Cl. ................................ 219/69.12
[58] Field of Search ............... 219/69.12, 69.14

[56] References Cited

U.S. PATENT DOCUMENTS

| | | | |
|---|---|---|---|
| 4,495,393 | 1/1985 | Janicke. | |
| 4,507,532 | 3/1985 | Inoue | 219/69.12 |
| 4,539,459 | 9/1985 | Yamagata | 219/69.12 |
| 4,564,431 | 1/1986 | Miyano | 219/69.12 |
| 4,598,189 | 7/1986 | Inoue et al. | 219/69.12 |
| 4,704,511 | 11/1987 | Miyano | 219/69.12 |
| 4,740,667 | 4/1988 | Obara | 219/69.12 |

FOREIGN PATENT DOCUMENTS

| | | | |
|---|---|---|---|
| 3303644 | 9/1983 | Fed. Rep. of Germany. | |
| 3317826 | 11/1983 | Fed. Rep. of Germany. | |
| 102725 | 6/1982 | Japan | 219/69.14 |
| 59-14428 | 1/1984 | Japan | 219/69.12 |
| 59-93236 | 5/1984 | Japan. | |
| 115126 | 7/1984 | Japan. | |
| 156623 | 9/1984 | Japan. | |
| 152326 | 7/1986 | Japan | 219/69.14 |
| 182725 | 8/1986 | Japan. | |
| 63-16924 | 1/1988 | Japan | 219/69.14 |
| 283825 | 11/1988 | Japan | 219/69.12 |
| 63-318220 | 12/1988 | Japan | 219/69.14 |
| 127229 | 5/1989 | Japan | 219/69.12 |

*Primary Examiner*—Geoffrey S. Evans
*Attorney, Agent, or Firm*—Sughrue, Mion, Zinn, Macpeak & Seas

[57] ABSTRACT

In a wire guide device for a wire electrodischarge machine, a holder member has at least an insertion path permitting insertion of wire electrode and a wire guide forming part of the insertion path. A housing holds the holder member and a guide holding sleeve is provided at the holder engaging part of the housing and resiliently holds the holder member by a device for a working fluid. A groove provided between the guide holding sleeve and the holder engagement part and forms a closed path for sealing the working fluid, and a pressure regulating device provided in the housing communicates with the groove. A positioning device positions the holder member with respect to the housing, around the electrode. A stylus shaped cleaning member (element 75) is used to remove chips deposited near the inner end of tapered cooling apertures to eliminate clogging.

8 Claims, 9 Drawing Sheets

WIRE GUIDE DEVICE FOR A WIRE ELECTRODISCHARGE MACHINE

BACKGROUND OF THE INVENTION

The present invention relates to an improvement for a wire guide device for a wire electrodischarge machine.

As is well known, a wire electrodischarge machine has wire guides above and below a workpiece in confrontation with each other. A wire electrode is passed through and guided by the wire guides, a pulsative discharge is generated while a machining fluid, such as water or oil, is fed to the minute gap between the wire electrode and the workpiece, and the workpiece is cut and machined into a desired shape as the wire electrode and the workpiece are moved relative to each other. The upper and lower wire guides for guiding the wire electrode are formed of die members consisting of diamond or some other very hard material, so that the wire electrode is guided with precision. Because the wire electrode and the wire guides are cooled by the machining fluid, and the machining fluid must be jetted to form a column enveloping the wire electrode, the wire guides are precisely supported in the wire guide devices.

Configuration of a prior-art wire guide device of this type will be described with reference to FIG. 11. FIG. 11 shows the one disclosed in Japanese Patent Application Kokai Publication No. 182725/1986, and shows a lower wire guide device. An upper wire guide device is similar. In the figure, reference numeral 1 denotes a holder member, which normally comprises a guide holder 1a having a wire guide 3 in the form of a die for causing the wire electrode 2 to pass through its center precisely and thereby to guide the wire electrode 2, and a holder integrally coupled with the guide holder 1a by means of a screw 1c. An insertion path 4 for the wire electrode 2 is provided in the axial center of the holder member 1. The wire guide 3, a feeder 5 for contacting and electricity-feeding the wire electrode 2, a set screw for fixing the feeder 5, and a second wire guide 7 provided on the set screw 6 form part of the insertion path 4.

Reference numeral 8 denotes a housing, having a holder engagement part 8a for the holder member 1. The holder member 1 is inserted in the engagement part 8a. With a tapered surface 1d provided on the guide holder 1a being in intimate contact with a confronting tapered surface 8b of the guide holder 1a, the holder member 1 is mounted. The holder member 1 is fixed by bolt 9 to the housing 8.

Reference numeral 10 denotes a hollow cap fixed to the housing 8 to cover the tip of the holder member 1, i.e., the guide holder 1a. The cap 10 has a jet aperture 10a for permitting a machining fluid to be jetted coaxially. The space inside the cap 10 forms a supply chamber 10b for supplying a machining fluid via conduits, not shown, extending through the housing 8.

Operation will now be described. The wire electrode 2 is guided by the wire guides 3 disposed above and below the workpiece and confronting each other, and is continuously fed from above to below at a constant speed. The machining fluid is supplied through conduits, not shown, to the supply chambers 10b in the upper and lower caps 10, to cool the wire guides 3 and the like, and is jetted through the jet apertures 10a of the upper and lower caps 10. The machining fluid from above the workpiece is jetted forming a fluid column enveloping the running wire electrode 2, therby filling the minute machining gap. The machining fluid from below the workpiece covers the machining part and rebounds. The wire electrode 2 is kept in contact with the feeder 5 and is thereby energized, so that pulsative discharges take place across the minute machining gap between the wire electrode 2 and the workpiece under the presence of the machining fluid. By moving the workpiece and the wire electrode 2 relative to each other two-dimensionally, the workpiece can be cut and machined into a desired shape.

In such a wire-cut electrodischarge machine, the wire guide 3 must be capable of preventing deformation during machining, and must be capable of moving precisely in accordance with the commands from the NC (numerical control) device during taper machining. For this reason, the wire guides 3 are held rigidly by the housing 8 and the holder member 1.

In the prior art, the wire guide 3 is fixed in the guide holder 1a, and the guide holder 1a is fixed to and thereby integrated with, by means of a screw 1c, the holder 1b having the feeder 5 mounted therein, and the integrated holder member 1 is inserted in the engagement part 8a such that the tapered surface 1d of the guide holder 1a is in intimate contact with the tapered surface 8b of the engagement section 8, and is fixed to the housing 8 by means of bolt 9.

A problem associated with the prior art machines is that, in a long-time continuous machining, and mold machining, it is necessary to overhaul, inspect and exchange the wire guides and other members for the following three reasons. The first reason is that the wire guide 3 has a very small clearance relative to the diameter of the wire electrode 2, so the wire guide 3 may be clogged by sludge, or chips of the wire electrode 2 in a continuous operation, necessitating cleaning. A second reason is that the feeder 5 being in contact with the wire electrode 2 may be worn out through a long-time machining, necessitating exchange with a new one. A third reason is that the wire guide 3 may be exchanged so that the wire guide 3 most suitable to the diameter of the particular wire electrode 2 is used.

In the prior art method of mounting the wire guides, it was very difficult, or it took a lot of trouble or a long time to restore the same machining precision after the overhaul, inspection, exchange, etc. First, explanation is made in connection with the first reason, i.e., the cleaning to remove the clogging. To remove the guide holder 1a, the bolt 9 must be loosened, and the holder member 1 integral with the holder 1b must be pulled out of the housing 8. The guide holder 1a and the holder 1b must be disassembled, and cleaned as required, and then assembled, and then inserted in the housing 8, and fastened by the bolt 9. In such a case, the original position of the wire guide 3 is rarely restored. The reason is that the regulation of the holder member in the axial direction is achieved by the taper surface 1d, but there is no regulation on the circumferential direction (rotational direction) of the wire electrode, so if there is a shift in the rotational direction during the mounting of the holder member 1, depending on the pressing force of the bolt 9, abutment between the taper surface 1d and the taper surface 8b of the housing 8 will not be uniform. For this reason, the path for the wire electrode 2 is not in alignment between the wire guides 3 provided above and below the workpiece. For instance, as shown in FIG. 12, if the lower wire guide 3 is shifted to the position 3C relative to the upper wire guide 3a, the path for the wire electrode 2 is shifted by S mm from the original position, and if the machining is conducted in this condition, the precision is poor. It is therefore necessary to examine whether the original inclination of the wire electrode 2 is restored.

As regards the exchange of the feeder 5 for the second reason, adjustment of the inclination of the wire electrode 2 is necessary as above, and time for removal and mounting is required and the adjustment of the inclination of the wire electrode 2 is additionally required. Moreover, even if the adjustment of the inclination of the wire electrode 2 is conducted. it is very difficult to attain or "reproduce" the orginal position precisely.

As regards the exchange of the wire guide 3 for the third reason, it is very difficult to align the center of the wire guide 3 with the axis of the guide holder 1a. For this reason, when the wire guide 3 is exchanged for one with a different diameter, it is necessary to conduct the adjustment of the inclination of the path for the wire guide 2.

The second problem is the insertion of the wire electrode into the lower wire guide. This is particularly serious where, in preparatory works or the like, the wire electrode 2 is automatically inserted, together with a column of a machining fluid jetted from the jet aperture 10a of the upper cap 10, in the lower wire guide 3. The reason is that the fluid column is introduced in the lower cap 10 and rebounds toward the axis of the wire electrode 2, and the column is disturbed because of the interference due to the rebound, creating troubles in the automatic insertion of the wire electrode 2.

A technique for preventing disturbance of the column of the machining fluid that has been generated normally is disclosed for example in the above-mentioned Japanese Patent Application Kokai Publication. However, this technique relates to the stage prior to the introduction of the disturbance of the column into the lower cap, and it does not solve the problem of disturbance of the column due to the rebound within the cap after the introduction.

The third reason is connected to the first reason, and relates particularly to the removal of the deposit near the lower wire guide. Such deposit can cause disconnection of the wire electrode 2, and must be removed from time to time. In a prior art, a structure in which a machining fluid is made to flow around the wire guide 3 is known, for example from Japanese Patent Application Kokai Publication No. 115126/1984 and Japanese Patent Application Kokai Publication No. 156623/1984. In the former publication, a plurality of openings for the passage of the machining fluid are provided between the wire guide 3 and the die holder of the guide holder 1a. In the latter publication, the guide holder 1a having the wire guide 3 is mounted within the nozzle main body (corresponding to the cap 10 in FIG. 11), and a multiplicity of openinigs are provided around the mounting part for the wire guide 3 in the guide holder 1a, so that machining fluid flows from inside the guide holder 1a, through the openings into the nozzle main body. In the former case, the holding force of the wire guide 3 is lowered because of the openings provided on the die holder, and the pressure of the machining fluid may displace the wire guide 3. In the latter case, there is no such possibility, but it is necessary to provide a multiplicity of openings in the guide holder 1a uniformly, so it is complex.

SUMMARY OF THE INVENTION

Accordingly, in view of the structure for holding the holder member to the housing, a first object of the present invention is to provide a wire guide device for a wire electrodischarge machine which facilitates overhaul, inspection, exchange, etc. of the wire guide and the like, and enables adjustment of the inclination of the wire electrode with a high precision.

A second object of the invention is to provide a wire guide device for a wire electrodischarge machine which facilitates insertion of the wire electrode into the lower wire guide, and which is highly reliable as to the insertion.

A third object of the invention is to provide a wire guide device for a wire electrodischarge machine which enables removal of deposits around the lower wire guide and cooling of the feeder and the like, in order to lengthen the interval for the overhaul, inspection, exchange, and the like of the wire guide and the like, Other objects of the invention will be apparent from the following description of the embodiments made with reference to the drawings.

To accomplish the first object, the wire guide device for a wire electrodischarge machine according to the invention is provided wherein at least an insertion path for a wire electrode and a wire guide forming part of the insertion are provided in the holder member, a guide holding sleeve having a working fluid sealed in a closed path is provided in a housing holder engagement section removably holding the holder member, and a pressure regulating means is provided in the housing, so that the holder member is resiliently held by the sleeve, and a positioning means for positioning along the circumference of the wire electrode between the holder member and the housing.

Moreover, according to the invention, a hollow cap having a machining fluid jet aperture coaxial with the wire electrode is mounted to cover the tip of the holder member.

Next, to achieve the second object of the invention, an upper cap is provided movable relative to the lower holder member in the direction of the axis of the wire electrode.

The movement (up-and-down movement) of the lower cap can be made either manually or automatically.

Furthermore, a nozzle having inner and outer nozzle chambers is interposed in the collection path connected to the insertion path in the lower holder member, and the outer nozzle chamber has a throttle aperture for jetting the pressurized fluid in the direction of the collection of the wire electrode, and a negative pressure is generated in the insertion path via said inner nozzle chamber.

Preferably, the machining fluid path provided in the lower holder member and the inner nozzle chamber are communicated by means of a communication path, and a check valve mechanism is provided to open and close this communication path, while a spool valve mechanism of the back pressure type is provided in the middle of the conduit connected to the machining fluid path and a working aperture is used to communicate the conduit connected to the outer nozzle chamber and the spool valve mechanism, whereby the rebound in the lower cap is suctioned via the machining fluid supply path, the check valve mechanism and the communication path to the inner nozzle chamber.

The above holder member is comprised of a guide holder with a T-shaped longtitudinal cross section and a hollow holder intergrated with each other, wherein the T-shaped guide holder has the above mentioned insertion path and a wire guide, and a hollow holder accommodates the guide holder and has a space around the guide holder, with a pressurized fluid being supplied into the space. A jet aperture is provided at the tip of the holder to jet the pressurized fluid coaxially with the wire electrode.

To achieve the third object of the invention, a cooling aperture is provided to communicate the insertion path and the machining fluid path in the lower holder member, and one end of the cooling aperture is opened to the path directly under the wire guide. The cooling aperture may be provided to communicate the supply chamber in the lower cap and the insertion path, and to remove the deposits which cause clogging of the cooling aperture, a stylus-shaped cleaning member is inserted in the cooling aperture and is supported by the lower cap such that the tip of the cleaning member is withdrawn relative to the inner end of the cooling aperture when the lower cap is lifted and is projecting a little relative the inner end when the lower cap is lowered.

According to the invention, when a pressure is applied to the working fluid by means of the working fluid pressure regulating means, the guide holding sleeve is resiliently deformed toward the center and the holder member is clamped against the housing by the centering action (action of a force toward the center). By the action of the means for positioning along the circumference of the wire electrode, the holder member restores its original holding position. Moreover, when the pressure of the working fluid is released, the guide holding sleeve returns to the original position and the clamping force is released and the holder member can be taken out of the housing with ease.

By mounting a hollow cap in the holder member, the machining fluid can be jetted through the jet aperture coaxially with the wire electrode, and the mounting and removal of the holder member to and from the housing can be made by holding the cap by hand.

Especially, when the lower cap is provided such that it is movable up and down relative to the holder member, by lifting the lower cap at the time of the automatic insertion of the wire electrode, the rebound of the machining fluid introduced within the cap toward the axis of the wire electrode can be reduced. Accordingly, disturbance of the fluid column from the above can be eliminated, and the insertion of the wire electrode is facilitated. Furthermore, at the time of manual insertion of the wire electrode, the lower cap can be lowered.

When a nozzle having inner and outer nozzle chambers is interposed in the collection path connected to the insertion path of the lower holder, and a pressurized fluid is supplied to the outer nozzle chamber to jet the pressurized fluid in the direction of the wire electrode collection, a negative pressure is created in the inner nozzle chamber, and acts on the insertion path to assist the insertion of the wire electrode. Moreover, when the machining fluid path of the lower holder is communicated through a check valve mechanism to the inner nozzle chamber and a spool valve mechanism of the back pressure type is provided in the middle of the conduit off the machining fluid path, and a working aperture is used to communicate the spool valve mechanism with the conduit connected to the outer nozzle chamber, the rebound in the lower cap can be suctioned by the negative pressure action within the inner nozzle chamber, and the insertion of the wire electrode can be achieved with a higher reliability.

When the upper holder member is of such a structure wherein a T-shaped guide holder having an insertion path and a wire guide in a hollow holder is accommodated, the pressurized fluid cools the wire guide from the outside and flows down the periphery of the guide holder, and jets through a jet aperture at the tip of the holder, forming a fluid column which envelopes the wire electrode. Accordingly, the guiding of the wire electrode at the time of the automatic insertion of the wire electrode can be achieved by the fluid column.

In addition, by providing a cooling aperture communicating the machining fluid path and the insertion path in the lower holder, part of the cooling fluid is guided into the path directly under the wire guide, so deposits near the wire guide can be cleaned. Moreover, when a stylus-shaped cleaning member is inserted such that one end of the cooling aperture is communicated with the supply chamber in the cap, and the tip of the cleaning member is withdrawn from the innner end of the cooling aperture when the cap is lifted, whereas it is projecting a little from the inner end of the cooling aperture when the cap is lowered, deposits near the cooling aperture are forcedly removed.

DETAILED DESCRIPTION OF THE PREFERRED EMBODIMENTS

Figure 1:
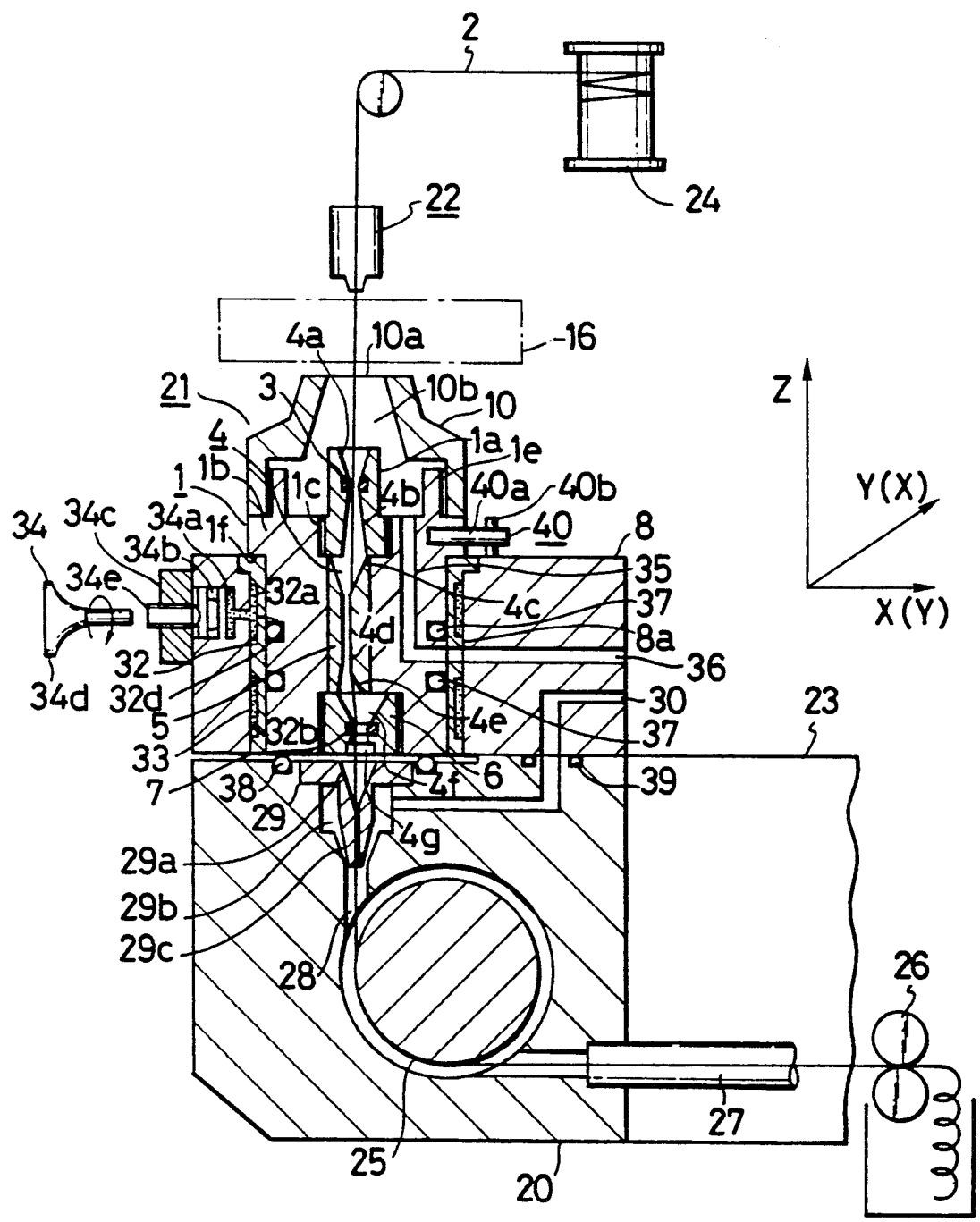
FIG. 1 is a cross sectional view showing a lower wire guide device of an embodiment of the invention.

Embodiments of the invention will now be described with reference to the drawings. FIG. 1 is a cross sectional view showing an embodiment of the wire guide device constructed to accomplish the first object of the invention. The lower guide is shown in detail. It should of course be understood that the upper wire guide has a similar construction.

As illustrated, an upper wire guide device 22 and a lower wire guide device 21 are disposed above and below a workpiece 16, and the lower wire guide device 21 is connected to the machine main body via a lower arm 23, while the upper guide device 22 is connected to the main body via main shaft, etc. of the upper wire guide device 22. A lower block 20 has a roller 25 for changing the direction by 90° of the wire electrode 2 rewound from a bobbin 24. The wire electrode 2 is directed to a recovery roller 26. Reference numeral 27 denotes a guiding recovery conduit provided between the roller 25 and the recovery roller 26.

The internal structures of the upper wire guide device 22 and the lower wire guide device 21 are similar, and description will now be made on the lower wire guide 21.

The lower wire guide device 21 comprises a housing 8 fixed to the lower block 20, and a circular-column-shaped holder member 1 removably mounted in the housing 8. Embedded in the tip of the holder 1b of the holder member 1 by means of thread 1c is a guide holder 1a having a wire guide 3. A cap 10 is fixed to cover the guide holder 1a. In the central part of the holder member 1, a feeder 5 for feeding electricity to the wire electrode 2 is fixed by means of a set screw 6. A second wire guide 7 is provided in the center of the set screw 6 for guiding the wire electrode 2. A wire electrode insertion path 4 formed of parts 4a, 4b, 4c, 4d, 4e, 4f, and 4g, are for permitting the wire electrode 2 to run, and is constructed to permit efficient insertion and passage of the wire in the central part of the holder member 1. The wire guides 3 and 7 cause the contact by means of rubbing of the feeder 5 against the path 4d, thereby to achieve electricity-feeding by contact.

The lower block 20 is provided with a collection path 28 for guiding the used wire electrode 2 through the roller 25 to the guiding recovery conduit 27. The collection path 28 communicates with the insertion path 4 in the holder member 1. Provided at the junction between the insertion path 4 and the collection path 28 is a nozzle 29 having inner and outer nozzle chambers 29a and 29b. The inner nozzle chamber 29a is connected to the path 4g in the set screw 6. The outer nozzle chamber 29b disposed on the lower side of the nozzle 29 is connected to a conduit 30 through which a pressurized fluid is supplied. The outer nozzle 29b has a throttle aperture 29c of a small diameter opened toward the direction of wire electrode collection of the collection path 28, so that when the pressurized fluid supplied into the outer nozzle chamber 29b is jetted through the throttle aperture 29c, the fluid speed is high at the aperture and a negative pressure can be generated in the inner nozzle 29a. The wire electrode 2 supplied from the above is thereby withdrawn, and is guided to the guiding recovery conduit 27 through the collection path 28.

Figure 3:
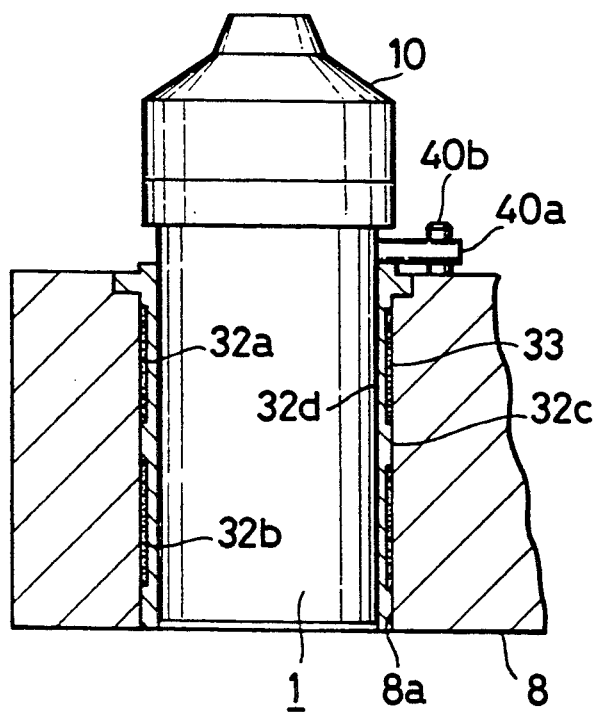

Reference numeral 32 dentoes a cylindrical guide holding sleeve securely and sealingly fixed, by soldering to a holder engagement part 8a of the housing 8. Provided at the outer periphery of the guide holding sleeve 32 are two annular grooves 32a and 32b which are at axially separated locations and which are filled with a working fluid 33 and form closed paths, and are connected by a communicating groove 32c (FIG. 3). The working fluid 33 is communicating with a pressure regulating means 34 provided in the housing 8. The pressure regulating means 34 comprises a cylinder chamber 34a into which the working fluid 33 is introduced, a piston 34b fitted in the cylinder chamber 34a, an adjustment screw 34e with a handle 34d threaded in plate 34c for pressing the piston 34b. Accordingly, by advancing the piston 34b rotation of the adjustment screw 34e, the pressure of the working fluid 33 is increased, and the pressure of the working fluid in the paths 32a to 32c of the guide holding sleeve 32 is also increased, and because of the static pressure, the thin part 32d of the sleeve 32 tends to deform toward the center, and a force toward the center is exerted around the entire periphery, and because of this, the outer periphery of the holder member 1 is securely clamped. The clamping force is high and is concentric. The precision with which the holder member 1 is reassembled is therefore very high. If the pressing force against the piston 34b is terminated, the pressure of the working fluid 33 becomes low (atmospheric pressure), and the clamping force of the guide holding sleeve 32 on the holder member 1 is released. It is therefore possible to pull out the holder member 32 out of the housing 8.

Reference numeral 35 denotes a machining fluid path provided in the holder member 1. The machining fluid path 35 communicates with the conduit 36 in the housing 8, thereby permitting supply of a machining fluid from the outside. The machining fluid is guided through the conduit 36 and the path 35, into a supply chamber 10b, and is then jetted through the jet aperture 10a toward the workpiece 16. Reference numeral 37 denotes an O ring for preventing the machining fluid from leaking through the outer periphery of the holder 1. Similarly, reference numerals 38 and 39 denote O rings.

Figure 2:
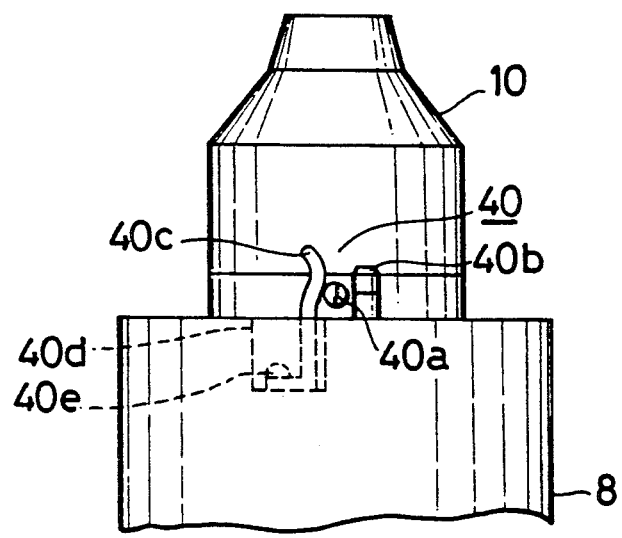
FIG. 2 and FIG. 3 are explanatory views showing another embodiment of positioning means.

Reference numeral 40 denotes a positioning means for positioning the holder member 1 along the circumference of the wire electrode. The positioning means 40 comprises a positioning pin 40a projecting from an outer periphery of the holder member 1, and a similar positioning pin 40b provided on the housing 8. These cooperate to regulate the direction of the rotation of the holder member 1. To increase the reliability of the positioning, a mechanism for holding, between them, the positioning pin 40a, as shown in FIG. 2, may be provided. In this mechanism, a rod-shaped spring 40c is fixed to a dent 40d by means of a bolt 40e or the like, and by virtue of the resiliency of the positioning pin 40a is held between them.

The positioning along the axis of the holder member 1 is achieved by the surface of the upper end of the guide holding sleeve 32 and the shoulder 1f of the holder member 1, as shown in FIG. 1. It is also possible to use the lower side of the positioning pin 40a for the positioning in the axial direction, as shown in FIG. 3.

The operation will now be described. First, the holder members 1 having a wire guide 3 suitable to the diameter of the wire electrode 2 are mounted to the upper wire guide device 22 and the lower wire guide device 21, and positioned axially and circumferentially, and clamped by the adjustment screw 34. In this state, the inclination of the wire electrode 2 relative to the workpiece 16 is not correct, so adjustment of the inclination of the wire electrode 3 is conducted. This is achieved by use of U and V axes (not shown). After this, the electrodischarge machining is started. During the machining, situations can arise wherein the holder member 1 is removed and mounted. Such situations include a situation in which the wire guide 3 is clogged, as a result of which the wire electrode 2 is often broken and machining is disabled. Another situation is that the feeder 5 is worn out and the machining is disabled. These situations can be forecasted, but the state of machining is not constant and can vary, so periodic exchange is not efficient and causes loss. It is therefore common to deal with these situations when the troubles actually happen. In such a case, the handle 34d is manipulated to loosen the adjustment screw 34e, and the piston 34b is retarded. The pressure of the working fluid 33 that has been maintained high is then reduced to a low pressure (atmospheric pressure), and the thin part 32d of the guide holding sleeve 32 that has been resiliently deformed toward the center restores its original shape. The clamping force against the holder member 1 is therefore eliminated. In this state, the holder member 1 is pulled out upward (in case of the lower guide device). Necessary treatment is then conducted, and the holder member 1 is again inserted in the housing 8. In this case, the insertion is made such that the positioning pin 40a is fitted in the holding mechanism shown in FIG. 2. The holder member 1 is pushed down until the shoulder 1f of the holder member 1 abuts the upper end surface of the guide holding sleeve 32. Then, keeping this state, the handle 34d is manipulated to advance the adjustment screw 34e to apply a pressure to the working fluid 33. The holder 1 is thereby clamped while positioned in the X, Y and Z directions. When a static pressure acts on the sleeve 32, because of the working fluid 33 at a high pressure, the entire periphery of the thin part 32d deforms and expands toward the center. This displacement occurs evenly around the entire inner periphery of the sleeve, so the outer peripheral surface of the holder member 1 is evenly pressed, and, inevitably, automatic centering action and the very accurate clamping action take place. Accordingly, the holder member 1 is mounted at a predetermined position relative to the housing 8.

Moreover, exchange of the holder member 1 as a p preparatory work when the diameter of the wire electrode 2 is changed, a similar work will lead to accurate mounting.

Figure 4:
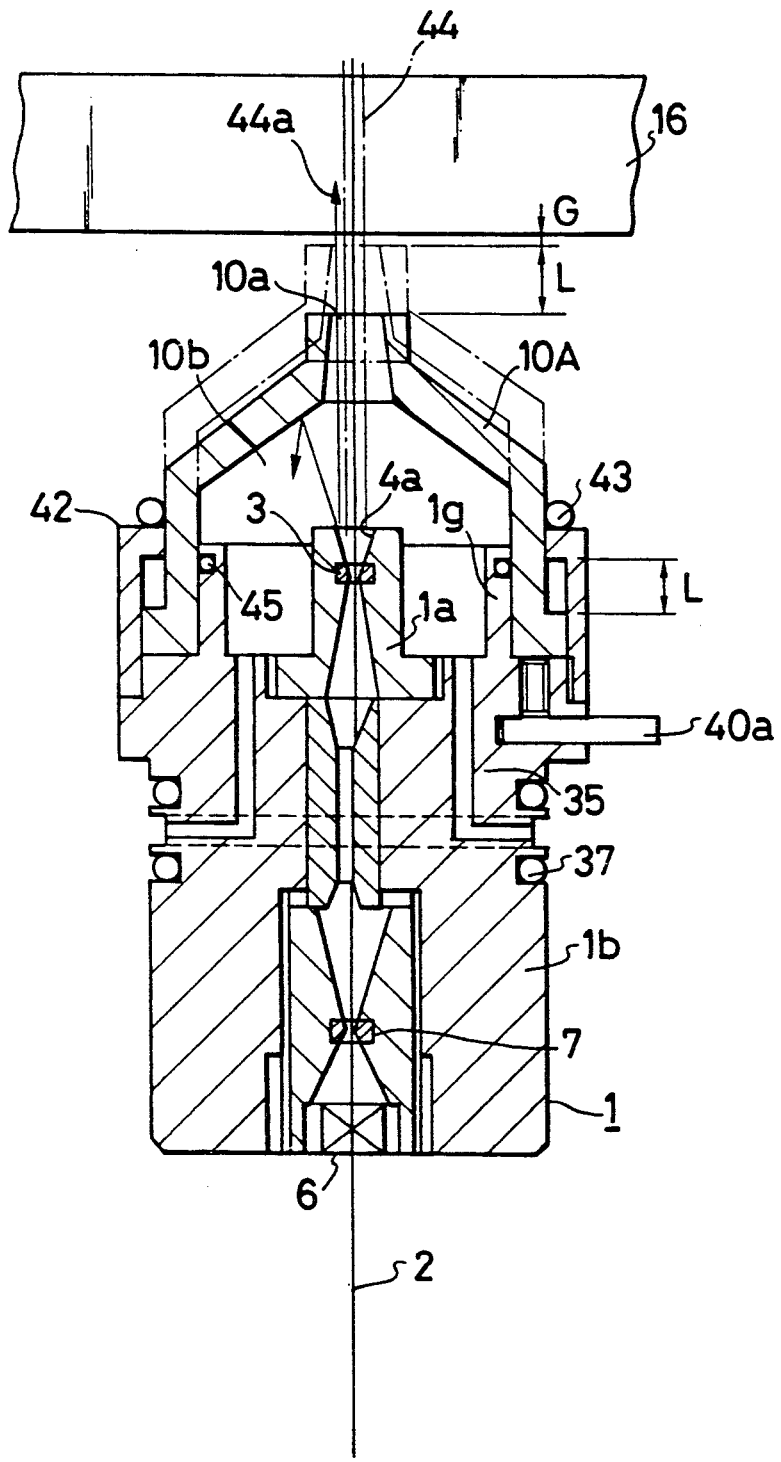
FIG. 4 is a cross sectional view showing the lower wire guide device of another embodiment of the invention.

Next, FIG. 4 is a cross sectional view showing an embodiment of the lower wire guide device structured to meet the second object of the invention. In FIG. 4, the holder member and the cap are shown and the holding mechanism for the holder member shown in FIG. 1 is omitted.

As was described earlier, when machining fluid in the form of a column flowing down with the wire electrode at the time of automatic insertion of the wire electrode is introduced into the lower cap 10, the working fluid rebounds within the cap 10 and interferes with the column and disturbs it. As a result, insertion of the wire electrode 2 in the lower wire guide 3 is interfered with. To eliminate this problem, in this imbodiment, the lower cap 10A is structured such that it can be moved, by manual operation, up and down in the direction of the axis of the wire electrode 2. That is, the lower cap 10A is slidable up and down, being guided by a nut member 42 threaded over the upper end of the holder member 1 and a cap engagement part 1g projecting from the upper surface of the holder member 1 over a stroke L mm. A resilient friction ring 43 such as an O ring fitted over the outer periphery of the lower cap 10A is fixed to the upper surface of the nut member 42, and by virtue of the friction force, the lower cap 10A can be held at any desired position. The holder member 1 is held, by centering action, by the housing 8 by means of the working fluid pressurizing means 34, and such structure (holding mechanism) is similar to that of FIG. 1, and the same reference marks are given and their description is omitted. Reference numeral 45 denotes an O ring mounted to the cap engagement part 1g.

The manner in which the lower cap 10A is used is as follows:

During machining, as shown by chain line in FIG. 4, the device is used with the lower cap 10 lifted by L mm such that the gap between the workpiece 16 and the lower cap 10A is G mm. When a machining fluid is supplied into the lower cap 10A, by virtue of the pressure, the lower cap 10A is lifted overcoming the friction force of the resilient friction ring 43 to be lifted by L mm.

When the wire electrode is manually inserted into the wire guide 3, such as in the preparatory works, the lower cap 10A is lowered to the lower extremity in advance. Then, the jet aperture 10a of the lower cap 10A approaches the wire guide 3, and the insertion is facilitated.

For automatic insertion, the lower cap 10A is lifted by L mm. The wire electrode 2 is guided by the column 44 of the working fluid jetted by the upper wire guide device 22 and into the lower cap 10A. In this case, the column 44 strikes the tapered surface of the insertion path 4a of the guide holder 1a within the supply chamber 10b of the lower cap 10A, and rebounds and scatters as shown by an arrow in FIG. 4. But with the lower cap 10A lifted, scattering fluid 44a that goes out through the jet aperture 10a is reduced, and they rarely interfere with the column 44, so that the wire electrode 2 is inserted into the wire guide 3 smoothly. Moreover, the holder member 1 is centered by the pressurizing means 34, and combined with the centering action, it facilitates the automatic insertion of the wire electrode 2, and the reliablility on the insertion is heightened.

Figure 5:
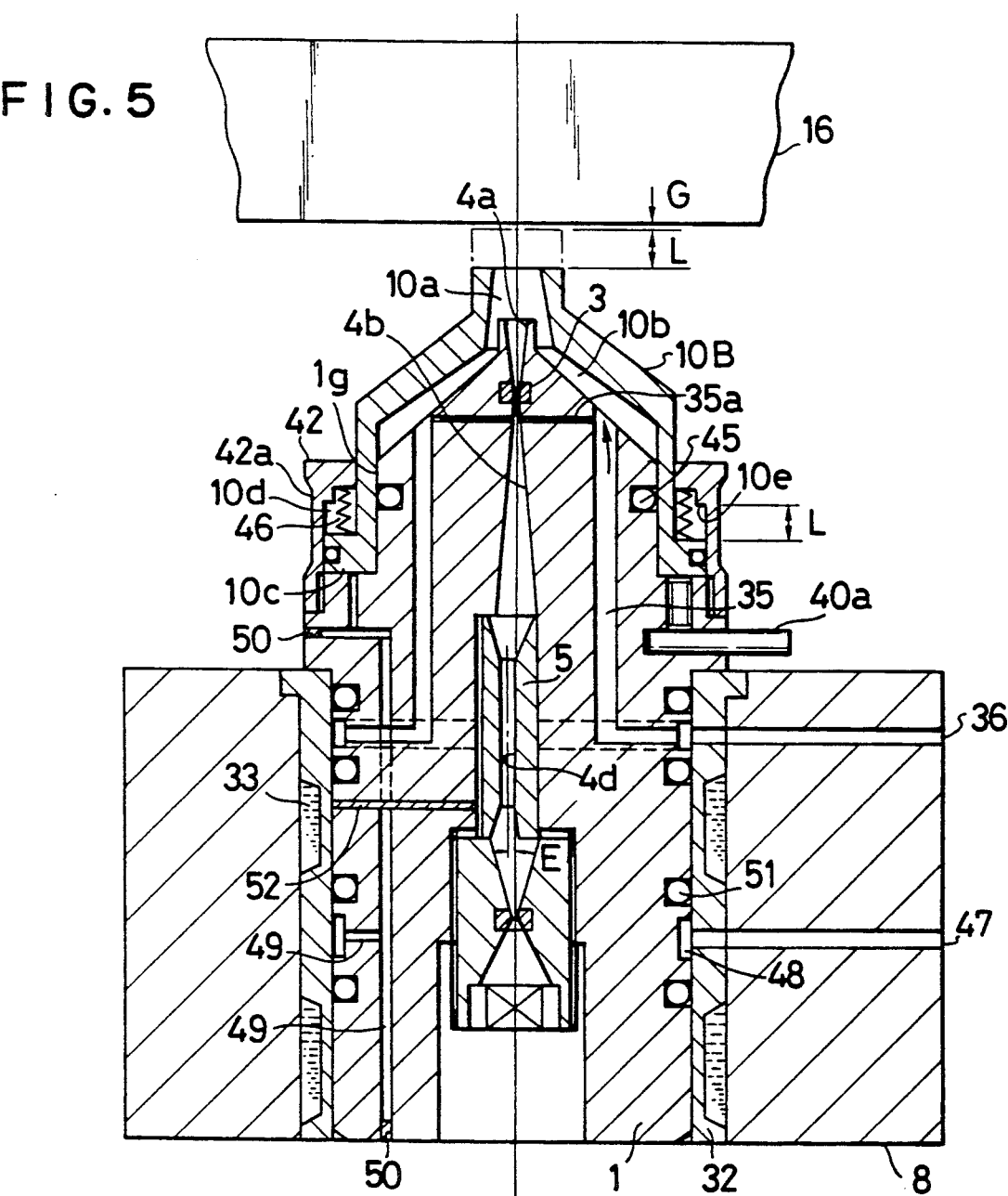
FIG. 5 is a cross sectional view of a lower wire guide device of a further embodiment of the invention.

FIG. 5 shows another embodiment in which the lower cap moves up and down automatically. In addition, a path for cleaning the wire electrode path and means for permitting efficient use of the feeder are provided.

During the preparatory work or when the workpiece 16 is moved by an NC (numerical control) device, the lower cap 10A of FIG. 4 needs to be pushed down by hand to avoid collision of the work piece 16 and the tip of the lower cap 10A. In the example shown in FIG. 5, the lower cap 10B is pushed down automatically by use of a spring 46, and the pushing up of the lower cap 10B is done automatically by liquid pressure.

Referring now to FIG. 5, a flange 10c at the lower end of the lower cap 10B makes piston action, and the space between the nut number 42 and the cap engagement part 1g of the holder member 1 forms a cylinder chamber 10d. A spring 46 biased in the direction to push down the lower cap 10B is mounted to the cylinder chamber 10d, and conduits 48 and 49 communicating with the conduit 47 in the housing 8 is provided in the holder member 1. A liquid pressure is made to act on the pressure receiving part of the flange 10c. Accordingly, the lower cap 10B is pushed up overcoming the force of the spring 46, abuts the stopper 10e and is lifted by a stroke L mm. When the liquid pressure is released, the lower cap 10B automatically restores its shape by virtue of the spring 46.

The upper part of the holder member 1 is substantially conical, and when the lower cap 10B is pushed up the insertion path 4a confronts the jet aperture 10a of the lower cap 10B. This is for facilitating manual insertion of the wire electrode 2. In FIG. 5, reference numeral 42a denotes a dent provided on the outer periphery of the nut member 42. The dent 42a is provided to facilitates insertion and removal of the holder member 1 into and out of the housing 8. Reference numeral 50 denotes a stop cock for the conduit 49, and reference numeral 51 denotes an O ring.

In FIG. 5, to enable cleaning and cooling of the insertion path 4b for the wire electrode 2, the feeder 5 and the like, a conduit 35a is provided to communicate a machining fluid path 35 with the insertion path 4b. One end of the conduit 35a is connected to the upper part of the insertion path 4b near the wire guide 3 to permit part of the machining fluid to flow down the insertion path 4b. While the wire electrode 2 runs, the wire electrode 2 is chipped, although at a very low rate, and the chips deposit at the wire guide 3, so part of the machining fluid flowing down the conduit 35a washes the chips away. Heat is generated at the path 4d of the feeder 5 by friction with the wire electrode 3, but the cooling of the path 4d of the feeder 5 simultaneously takes place. Possibility of breakage of the wire electrode 3 is therefore reduced, and the lifetime of the wire guide 3, the feeder 5 and the like is extended.

Figure 6:
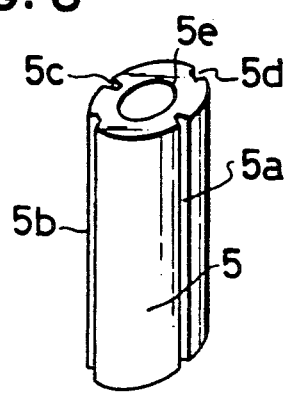
FIG. 6 is an external view of a feeder used in the device of FIG. 5.

Moreover, the feeder 5 used in FIG. 5 is provided with longitudinal grooves 5a, 5b, 5c and 5d at an interval of 90°, as shown in FIG. 6. A pin 52 is embedded in the holder member 1 to engage with one of the longitudinal grooves to guide the feeder 5 and to prevent the rotation of the feeder 5.

As shown in FIG. 5, the feeder 5 is disposed at a position deviated by E mm from the center of the wire electrode 2. So if the pin 52 engages with the longitudinal groove 5b, the contact friction occurs at the wire electrode contact position 5e (on the inner periphery of the feeder 5) diametrically opposite to the groove 5b. The amount of rubbing of the wire electrode 2 and the path 4d is given by the amount of eccentricity E mm, so when the wear becomes E mm, the rubbing force becomes zero, and the contact feeding becomes impossible. In such a case, the angular position of the feeder 5 is shifted by 90°, and the feeder 5 is again used. In all, the feeder 5 can be used at four positions, and the feeder 5 can be fully utilized.

Figure 7:
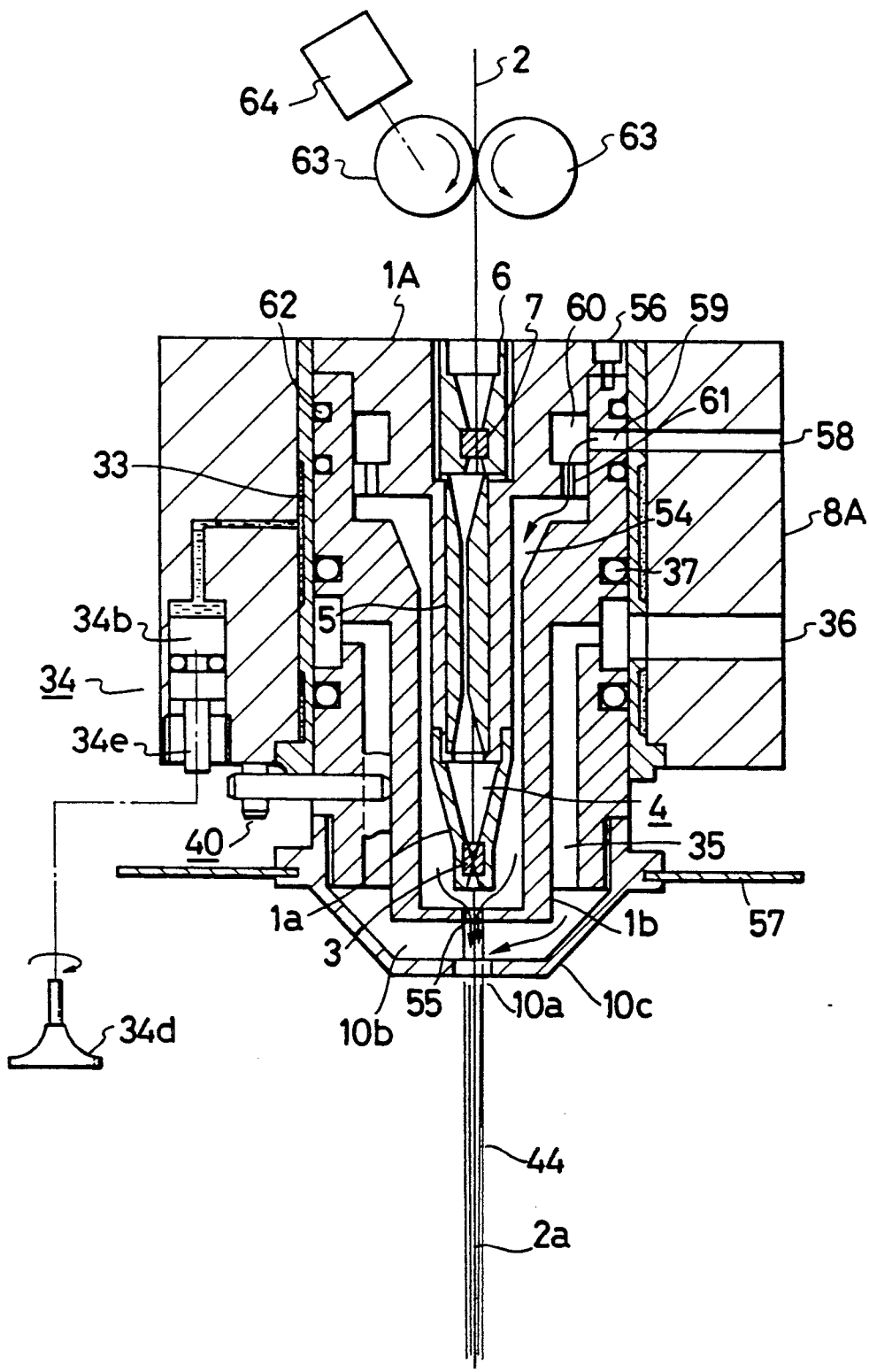
FIG. 7 is a cross sectional view showing an upper view guide device of a further embodiment of the invention.
Figure 8:
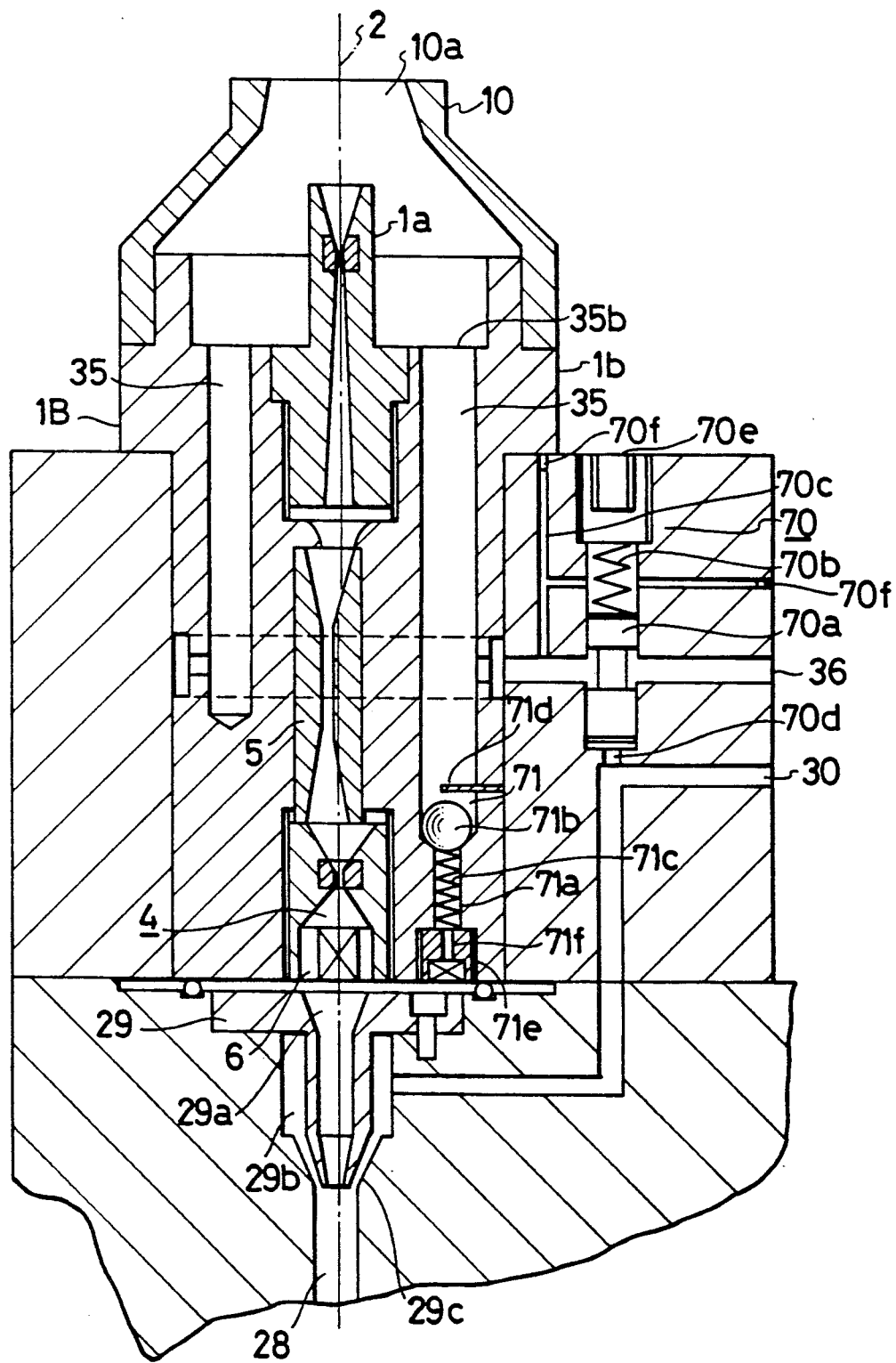
FIG. 8 is a cross sectional view of a lower wire guide device of a further embodiment of the invention.

FIG. 7 and FIG. 8 show an example in which the reliability of the automatic insertion of the wire electrode is improved. FIG. 7 is a cross sectional view of the upper wire guide device 22, and FIG. 8 is a cross sectional view of the lower wire guide device 21.

In FIG. 7, the holder member 1A comprises a guide holder 1a with a T-shaped longitudinal cross section having a wire guide 3 at its tip (lower end) and a hollow holder 1b for accommodating the guide holder 1a leaving a space 54 around the guide holder 1a. It also has a nozzle 55 at its tip. The guide holder 1a and the holder 1b are fixed by means of a plurality of bolts 56, only one of which is illustrated. Mounted to the tip of the holder 1b is a cap 10C having a cover 57 for preventing the machining fluid from scattering. Provided in the center of the guide holder 1a is an insertion path 4 for the wire electrode 2. The feeder 5, the set screw 6 and the second wire guide 7 are disposed on the insertion path 4, in the same way as in FIG. 1. Moreover, the structure for removably holding the holder member 1A via the guide holding sleeve 32, by means of the holding mechanism for the holder member 1A, i.e., the working fluid pressure regulating means 34, and the positioning means 40 for positioning the holder member 1A in the direction of the circumference the wire electrode are similar to those of FIG. 1.

In addition to the conduit 36 communicating with the machining fluid path 35 of the holder 1b, the housing 8A is provided with a conduit 58 for supplying the machining fluid to the nozzle 55 via the above mentioned space 54. The conduit 58 communicates with the space 54 via a communication aperture 59 provided in the holder 1b, a pool chamber 60 provided on the outer periphery of the guide holder 1a to prevent turbulences, and a multiplicity of small apertures 61 communicating with the pool chamber 60. In FIG. 7, reference numeral 62 denotes a sealing O ring provided at the part joining the conduit 58 and the communication path 59. Reference numerals 63 and 63a denotes wire electrode feed rollers. Reference numeral 64 denotes a motor for driving the feed roller 63. The housing 8A is coupled to the machine main body via U and V axis devices, not shown, having a minute stroke.

Referring now to FIG. 8, the holder member 1B is similar to the one shown in FIG. 1, but differs in that a suction mechanism is provided to ensure automatic insertion of the wire electrode 2. For simplifying the illustration, the pressure regulating means 34 for the working fluid and the positioning means 40 for the holder member 1B are omitted.

The suction mechanism 70 comprises a spool valve 70a provided in the middle of the conduit 36 in the housing 8B, and a check valve mechanism 71 for communicating the machining fluid path 35 of the holder 1b and the chamber 28a of the nozzle 28. The spool valve mechanism 70 comprises as spool valve 70a for opening and closing the conduit 36, a spring 70b for biasing the spool valve 70a toward the open position for the conduit 36, a back pressure conduit 70c communicating with the conduit 36 and moving the spool valve 70a toward the open position, and a working aperture 70d communicating with the aperture 30 and moving the spool valve 70a toward the closed position overcoming the biasing force of the spring 70b. In FIG. 8, reference numeral 70e denotes a set screw for the spring 70b, and reference numeral 70f denotes an end stop cock for the back pressure conduit 70c.

The check valve mechanism 71 comprises a ball valve 71b for opening and closing a communication aperture 71a which communicates the machining fluid path 35 to an inner nozzle chamber 29a, a spring 71c for biasing the ball valve 71b toward the opening position for the communication aperture 71a, and a stopper pin 71d for limiting the movement for opening the ball valve 71b by the spring 71c. In FIG. 8, reference numeral 71e denotes a set screw for the spring 71c. The set screw 71e has a small aperture 71f for communicating the communication aperture 71a with the nozzle chamber 29a.

Operation of the embodiment of FIG. 7 and FIG. 8 will now be described.

First, in connection with the embodiment of FIG. 7, at the time of automatic insertion of the wire electrode 2, when the machining fluid is supplied through the conduit 58, the machining fluid is passed through the communication path 59, the pool chamber 60, and the multiplicity of the small apertures 61 and supplied into the space 54, and cools the outer side of the wire guide 3, and jets through the nozzle 55 at the tip of the holder 1b, and forms a column 44 of fluid of a high pressure coaxial with the wire electrode 2 and enveloping the wire electrode 2.

The wire electrode 2 is first cut by a cutting mechanism (not shown), and its tip 2a is fed by the rollers 63 and 63a, and along the insertion path 4, and pushed out of the nozzle 55. In this state, the machining fluid is supplied as stated above and jetted through the nozzle 55 forming a fluid column 44. Then, the tip 2a of the wire electrode 2 is enveloped by the column 44 and guided downward, together with the column 44. The feed roller 63 keeps feeding the wire electrode 2. In this way, the tip 2a of the wire electrode 2 is prevented from escaping out of the column 44, is passed through the workpiece 16, and is guided into the cap 10 in the lower wire guide device 21, and then is guided along the insertion path 4 in the lower device, and automatically inserted in the wire guide 3.

When column 44 is introduced into the lower cap 10, the column 44 may be disturbed because of the rebound of the machining fluid as described above. For this reason, the arrangement of FIG. 8 includes a mechanism as described above, for positively suctioning the scattering fluid in the lower cap 10 and the wire electrode 2.

Operation of the suction mechanism will now be described. When a pressurized fluid is supplied through the conduit 30, since the conduit 36 is at a low pressure, the pressurized fluid acts on the spool value 70a to move the spool valve 70a overcoming the force of the spring 70b and closing the conduit 36. The ball valve 71b is lifted by the spring 71c to open the communication aperture 71a. Accordingly, the machining fluid path 35 and the nozzle chamber 29a within the nozzle 29 are in communication. The pressurized fluid is therefore supplied to the outer nozzle chamber 29b and jetted through the throttle aperture 29c into the collection path 28. A negative pressure is then created in the inner nozzle chamber 29a and the insertion path 4 in the lower device. Because of the creation of the negative pressure, the wire electrode 2 is positively drawn in the direction of the collection path 28, and the scattering fluid in the lower cap 10 is drawn via the machining fluid path 35 and the communication aperture 71a into the inner nozzle chamber 29a. Thus the disturbances obstructing to the the insertion of the wire electrode 2 is positively eliminated, so that the automatic insertion of the wire electrode 2 into the lower wire guide 3 is facilitated and becomes reliable.

In ordinary machining, the conduit 30 is at a low pressure, and the spool valve 70a is pushed by the spring 70b to open the conduit 36, and the pressure of the machining fluid supplied to the conduit 36 via the back pressure conduit 70c acts to fix the spool valve 70a at the open position. Accordingly, the machining fluid flows via the conduit 36 into the machining fluid path 35, pushes down the ball valve 71b, closing the communication aperture 71a, and flowing into the lower cap 10 via the aperture end 35b at the top, and is jetted through the jet aperture 10a.

Figure 9:
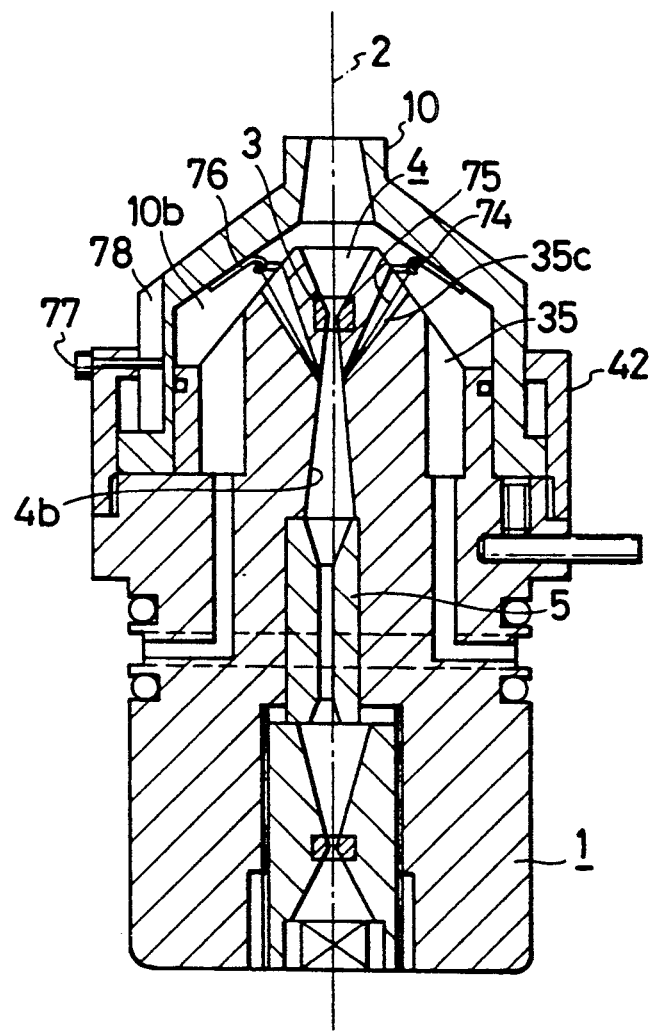
FIG. 9 is a cross sectional view of a lower wire guide device of a further embodiment of the invention.
Figure 10:
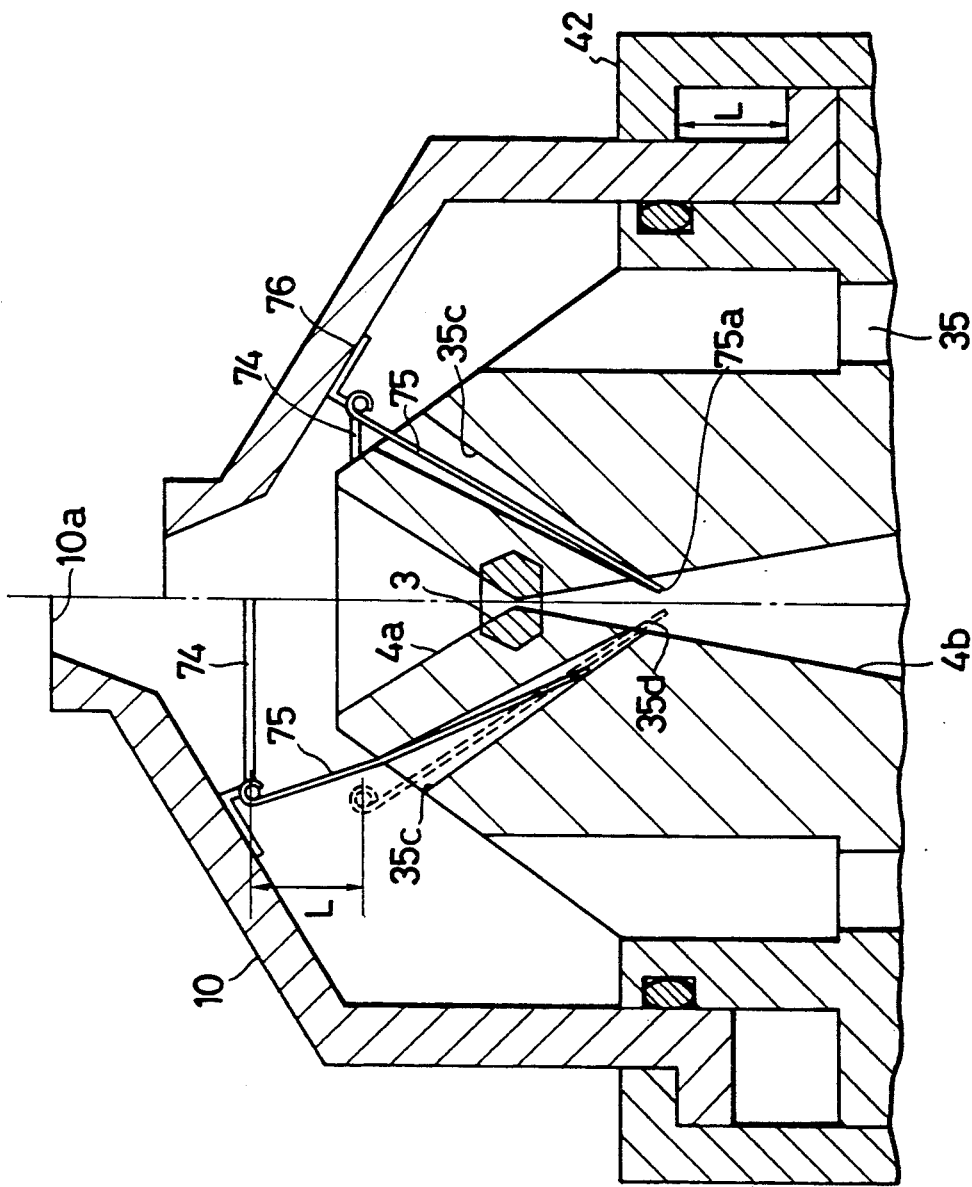
FIG. 10 is an explanatory view showing the operations with the cap lifted and lowered.
Figure 11:
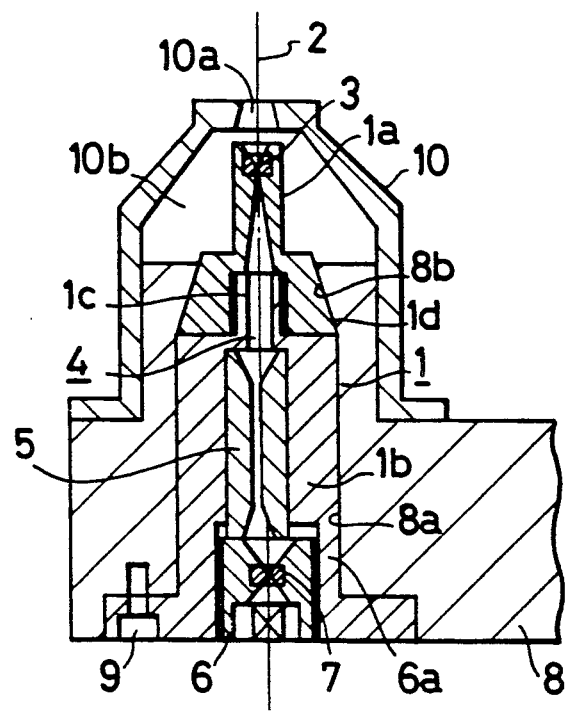
FIG. 11 is a cross sectional view of a conventional lower wire guide device.
Figure 12:
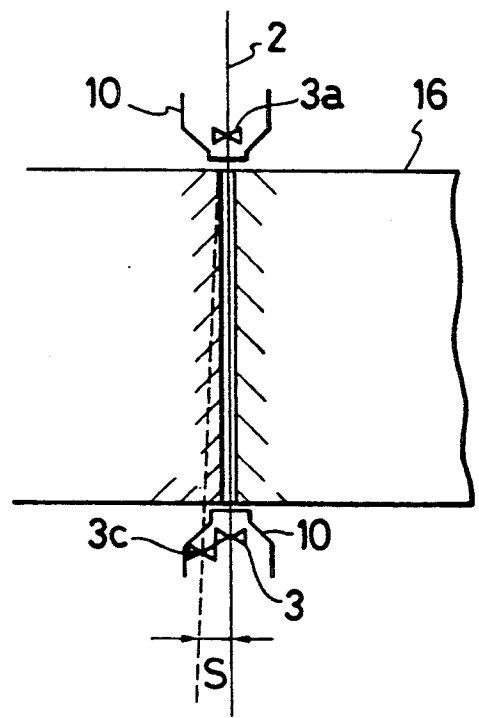
FIG. 12 is an explanatory view showing deviation of the wire guide electrode path.

FIG. 9 is a cross sectional view showing an embodiment of a wire guide device structured to achieve the third object of the invention. FIG. 10 shows it in operation. The left half shows the cap lifted, while the right half shows the cap lowered.

As was mentioned a little in the description of FIG. 5, it is convenient to provide a cooling aperture to permit flow-down of part of the machining fluid fot the purpose of cleaning and cooling the insertion path 4 for the wire electrode 2. In the embodiment of FIG. 9, a plurality of cooling apertures 35c are provided to communicate the supply chamber 10b of the lower cap 10 and the insertion path 4, and the cooling apertures 35c are tapered to have a larger diameter near the supply chamber 10b and a smaller diameter near the insertion path 4, and the cooling apertures 35c in the form of such tapered apertures are formed by boring obliquely from the above in the holder member 1 toward the insertion path 4b directly under the wire guide 3. Moreover, each cooling aperture 35c is provided with a stylus-shaped cleaning member 75 inserted in the cooling aperture 36c and supported by a ring 74. As shown in FIG. 10, the tip 75a of the cleaning member 75 is withdrawn relative to the inner end 35d of the cooling aperture 35c when the cap is lifted, and is projecting relative to the inner end 35d when the cap is lowered. The base end of the cleaning member 75 is journaled by the ring 74 such that it can rotate freely. The ring 74 is fixed to the inner surface of the cap 10 by means of a metal fitting 76.

The lower cap 10 is similar in structure to that shown in FIG. 4, but a guide pin 77 and a guide groove 78 for guiding the up-and-down movement of the cap 10 are respectively provided on the nut 42 and the cap 10.

Operation of this embodiment is as follows:

In the ordinary electrodischarge machining, the machining fluid filling the chamber 10b is jetted at a high pressure through the jet aperture 10a toward the workpiece, and is also supplied through the cooling apertures 35c to the insertion path 4b. The machining fluid that has flown into the insertion path 4b cleans the chips of the wire electrode 2 that have deposited near the wire guide 3 as described above, and cools the feeder 5 and the like. When the machining is continued for a long time, the chips also deposit near the inner ends of the cooling apertures 35c and may cause clogging. In such a case, if the lower cap 10 is moved up and down, the tips 75a of the cleaning members 75 move in and out of the inner ends 35d of the cooling apertures 35c, so the deposits near the cooling apertures 35c are removed, and the clogging is eliminated.

As will be apparent from what has been described, the invention permits various modifications and improvements. For instance, the holder member and the guide holding sleeve are generally cylindrical, but clamping part of these members may be polygonal. With this modification, the positioning of the holder membger along the circumference is made utilizing the outer shape.

Moveover, pressure regulation of the working fluid by means of the pressure regulating means can be made automatically by the use of a motor and the like.

As has been described, according to the invention, the following effects are obtained.

(1) The pressure of the working fluid sealed between the guide holding sleeve and the housing is increased and decreased to resiliently deform the guide holding sleeve coaxially with the wire electrode, so the holder member can be clamped under centering action, and, in cooperation with the means for positioning the holder means along the circumference, the adjustment of the inclination of the wire electrode at the time of removal and mounting can be restored with ease and with a high precision. Accordingly, it is very convenient at the time of the overhaul, inspection, exchange, etc.

(2) The rebound of the machining fluid toward the wire electrode axis at the time of the insertion of the wire electrode, which forms an obstacle to the insertion of the wire electrode, can be reduced by structuring the lower cap movable toward the wire electrode axis.

(3) Because a nozzle having inner and outer nozzle chambers is is interposed in the collection path coonnected to the insertion path in the lower holder member, and the pressurized fluid is jetted through the throttle aperture of the outer nozzle chamber in the wire electrode collection direction of the collection path at a high speed, a negative pressure is created in the insertion path via the inner nozzle chamber. As a result, a pulling force acts on the wire electrode, and insertion of the wire electrode is assisted, and is thereby facilitated.

(4) The rebounding liquid within the lower cap is communicated through the machining fluid path of the holder member and the check valve mechanism, to the inner nozzle chamber, and the negative pressure is used for the suctioning. As a result, the disturbances at the time of the insertion of the wire electrode can be reduced, and the reliability of the wire electrode insertion is heightened.

(5) The upper holder member is structured for jetting to form a fluid column of the machining fluid coaxially with the wire electrode. As a result, the guiding at the time of the automatic insertion of the wire electrode is facilitated.

(6) The machining fluid path in the lower holder member and the path directly under the wire guide are communicated by a cooling aperture, so by washing with the machining fluid, the deposits near the wire guide can be removed without disassembling the holder member. Moreover, cooling of the feeder can also be achieved. Accordingly, the lifetime of the wire guide and the feeding are lengthened.

(7) By moving the lower cap up and down, cleaning members inserted in the cooling apertures move in and out of the inner ends of the cooling apertures, and the removal of deposits can be made without fail. It is therefore convenient.

What is claimed is:

1. A wire guide device for a wire electrodischarge machine comprising:
   a holder member having at least an insertion path permitting insertion of a wire electrode and a wire guide forming part of said insertion path;
   a housing for removably holding the holder member and having a holder engagement part;
   a guide holding sleeve provided at said holder engagement part of said housing and resiliently holding the holder member by means of a working fluid;
   a groove provided between said guide holding sleeve and the holder engagement part and forming a closed path for sealing said working fluid;
   a pressure regulating means provided in said housing and communicating with said groove; and
   a positioning means for positioning said holder member with respect to the housing, around said wire electrode.

2. A wire guide device for a wire electrodischarge machine as set forth in claim 1, wherein said holder member has a hollow cap having a jet aperture for jetting a machining fluid coaxially with said wire electrode.

3. A wire guide device for a wire electrodischarge machine as set forth in claim 2, wherein said holder member comprises a lower holder member, which has a cap movable in the direction of the axis of said wire electrode.

4. A wire guide device for a wire electrodischarge machine comprising:
   a wire electrode insertion path provided in a lower holder member;
   a machining fluid path provided in said lower holder member;
   a cap mounted on said lower holder member and having a supply chamber for a machining fluid from said machining fluid path;
   a cooling aperture for communicating said insertion path with said supply chamber in said cap and having one end open to part of said insertion path directly under the wire guide; and
   a stylus-shaped cleaning member inserted in said cooling aperture and supported by said cap;
   wherein the tip of said cleaning member is withdrawn relative to a first end of said cooling aperture when the cap is substantially lifted, and is projecting relative to the first end of said cooling aperture when the cap is substantially lowered.

5. A wire guide device for a wire electrodischarge machine comprising:
   a wire electrode insertion path provided in a lower holder member;
   a wire electrode collection path connected to said insertion path;
   a nozzle having inner and outer nozzle chambers interposed in the collection path;
   the inner nozzle chamber of said nozzle being connected to said insertion path; and
   the outer nozzle chamber of said nozzle being connected to a conduit for a pressurized fluid supply; and
   a throttle aperture provided in the outer nozzle chamber for jetting the pressurized fluid toward the direction of the wire electrode collection path, so as to create a negative pressure on said inner nozzle chamber.

6. A wire guide device for a wire electrodischarge machine comprising;
   a wire electrode insertion path provided in a lower holder member;
   a wire electrode collection path connected to said insertion path;
   a nozzle having inner and outer nozzle chambers interposed in the collection path, the inner nozzle chamber of said nozzle being connected to said insertion path, and the outer nozzle chamber of said nozzle being connected to a conduit for a pressurized fluid supply;
   a throttle aperture provided in the outer nozzle chamber for jetting the pressurized fluid toward the direction of the wire electrode collection path, and
   a machining fluid path provided in said lower holder member;
   a communication path for communicating said machining fluid path with said inner nozzle chamber;
   a check valve mechanism for opening and closing said communication path; and
   a back pressure-type spool valve mechanism provided in the middle of the conduit connected to said machining fluid path and having a working aperture communicating with the conduit for supplying said pressurized fluid.

7. A wire device for a wire electrodischarge machine comprising:
   an upper holder member having an insertion path permitting insertion of a wire electrode and a wire guide forming at least part of said insertion path; and
   a housing for removably holding said upper holder member;
   wherein said upper holder member comprises:

guide holder with a T-shaped longitudinal cross section having said insertion path and said wire guide;

a hollow holder for accommodating said guide holder and having a space around said guide holder;

with a pressurized fluid being supplied into said space via said housing; and a jet aperture provided at the tip of said holder to jet said pressurized fluid coaxially with said wire electrode.

8. A wire guide device for a wire electrodischarge machine comprising:

an insertion path for a wire electrode provide in a lower holder member;

a machining fluid path provided in said lower holder member; and means for cooling and cleaning said insertion path for the wire electrode, said means comprising a cooling aperture means for communicating said insertion path with said machining fluid path, said cooling aperture means comprising at least one cooling aperture having a tapered configuration to allow flow-down of said machining fluid to clean and cool said insertion path for the wire electrode, and having one end open to part of said insertion path directly under the wire guide.

* * * * *